United States Patent Office 3,544,624
Patented Dec. 1, 1970

---

3,544,624
PROCESS FOR PREPARING ACRYLIC ACID
AND METHACRYLIC ACID
G. Charles Anderson, Johnson City, and Edgar L. McDaniel and Howard S. Young, Kingsport, Tenn., assignors to Eastman Kodak Company, Rochester, N.Y., a corporation of New Jersey
No Drawing. Filed Dec. 6, 1967, Ser. No. 688,322
Int. Cl. C07c 51/26
U.S. Cl. 260—530　　　　　　　　　　　　　　7 Claims

ABSTRACT OF THE DISCLOSURE

Process for the oxidative conversion of alpha,beta-unsaturated aldehydes to the corresponding unsaturated acids comprising contacting a mixture of vaporized aldehyde and oxygen at a temperature from about 250° C. to about 500° C. with a novel catalyst composition comprising oxidized molybdenum and at least one of oxidized niobium, oxidized zirconium, oxidized titanium, and oxidized tantalum. The novel catalyst optionally includes oxidized arsenic. Acrylic acid and methacrylic acid may be subsequently converted to lower alkyl esters for use in the plastics industry.

---

This invention concerns the vapor-phase oxidation of alpha,beta-unsaturated aldehydes to alpha,beta-unsaturated monocarboxylic acids in the presence of a novel catalyst. A specific aspect of the invention is the preparation of acrylic acid or methacrylic acid by reacting acrolein or methacrolein with oxygen in the vapor phase in the presence of a novel catalyst composition containing catalytically active molybdenum and at least one of catalytically active tantalum, zirconium, titanium and niobium, with or without catalytically active arsenic. The invention is further concerned with the above novel catalysts per se, and with processes for preparing the same.

It is known that certain alpha,beta-unsaturated aldehydes such as acrolein and methacrolein are converted to the corresponding alpha,beta-unsaturated acids by catalytic oxidation of the aldehyde to the acid in the presence of certain coprecipitated catalysts. None of the prior art, however, discloses or suggests the use of the novel catalyst compositions of this invention in the conversion process. For example, U.S. Pat. 2,881,213, issued to Idol et al., discloses the oxidation of acrolein and methacrolein to acrylic and methacrylic acid, respectively, in the presence of a catalyst comprising at least one of the oxides of molybdenum and chromium. It is evident that the Idol et al. patent discloses a catalyst containing neither the oxidized tantalum, zirconium, titanium or niopium as a promotor.

It is therefore an object of this invention to provide a more efficient process including catalysts and their preparations for the conversion of alpha,beta-unsaturated aldehydes to the corresponding alpha,beta-unsaturated monocarboxylic acids, and more particularly to provide improved processes and catalysts for the preparation of acrylic acid and methacrylic acid from acrolein and methacrolein.

Other objects, features, and advantages of this invention will become apparent from a consideration of the following detailed description.

These objects are accomplished in accordance with the present invention through the discovery that a process of contacting oxygen and a suitable aldehyde with the present novel catalyst compositions embodies substantial improvements over prior processes. In carrying out the process in accordance with the present invention, a feed mixture containing, for example, acrolein and oxygen in the vapor phase and at elevated temperature is passed over the catalyst composition to form acrylic acid. The chemical reaction which takes place may be represented theoretically by the following equation:

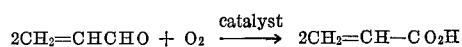

$$2CH_2{=}CHCHO + O_2 \xrightarrow{\text{catalyst}} 2CH_2{=}CH{-}CO_2H$$

It can be seen from this equation that the molar stoichiometric ratio of acrolein to oxygen is 1:0.5. If air were the source of oxygen, the stoichiometric ratio of acrolein to air would be about 1:2.38. Ratios of aldehyde to oxygen in the reaction mixture of about 1:0.5 are typical although the ratio may be varied rather widely. For example, aldehyde to oxygen mole ratios of 1:0.3 to 1:5 are operative although ratios of 1:0.4 to 1:1.5 are preferred, and ratios of 1:0.5 to 1:0.9 are most preferred.

The oxygen employed in our process may be derived from any suitable source such as pure oxygen or mixtures of oxygen with inert gases such as nitrogen, $CO_2$, or flue gas. Air is an especially preferred source of oxygen, since it is so inexpensive and is easily obtained. Diluents such as nitrogen or water vapor are desirable constituents, and may be added to the feed stream of aldehyde and oxygen in amounts of about 1 to 6 moles per mole of aldehyde.

The aldehydes used in the process of this invention are flammable compounds, and therefore it may be a desirable practice to avoid feeding flammable mixtures. This can be done in one of several ways, such as by controlling the ratio of aldehyde to oxygen or by adding an inert diluent such as nitrogen or $CO_2$. Another technique for suppressing flammability is the addition of a flammable diluent such as one or more of the lower alkanes. Thus, propane, ethane or methane might be added to render the feed mixture less flammable. As is known to those skilled in the art, the use of fluid-bed catalysts also aids materially in decreasing the hazards of explosion .

The temperature maintained during the reaction is variable within limits of about 250° C. to about 500° C., while temperatures of 300–450° C. are preferred, and temperatures of 325–425° C. are most preferred. The reaction is not significantly pressure dependent, and therefore, the choice of operating pressures is generally governed by economic considerations. Pressures ranging from about 1 to about 5 atmospheres are preferred, but excessive pressures should be avoided when using acrolein since it is such a highly reactive material.

The contact time chosen is a function of several variables, including reaction temperature, composition of catalyst, and type of reactor. The levels chosen for these variables enable one to strike a balance among conversion, yield and productivity. It will be appreciated by those skilled in the art that under certain conditions the type of reactor predetermines the range of contact times. Thus, in a fluid bed reactor the linear velocity of the feed stream must be approximately above the minimum fluidization velocity of the catalyst bed and below the terminal velocity of the smaller particles, or velocity at which these particles are removed from the fluidized bed by entrainment. Contact time is defined as the average time, at reaction conditions, which the reactants spend in a volume equal to that of the bulk catalyst bed, assuming ideal behavior of the feed gases. Contact times of 0.5 to 20 seconds may be used with good results, but contact times of 1 to 12 seconds are preferred, and contact times of 1 to 8 seconds are most preferred.

The percent conversion of acrolein to acrylic acid $$= \frac{\text{moles acrylic acid formed} \times 100}{\text{moles acrolein fed}}$$

and

The percent yield of acrylic acid $$= \frac{\text{moles acrylic acid formed} \times 100}{\text{moles acrolein consumed}}$$

The process of our invention may be carried out by passing a mixture of the desired aldehyde, oxygen, and a diluent such as nitrogen at elevated temperatures over the catalyst, whereby a substantial portion of the feed stream is converted to desired products which are then recovered. Recovery of the products produced in accordance with this invention may be effected by conducting the effluent gases from the reactor through suitable cooling and separatory equipment. The unsaturated acid product is removed from the effluent stream of gases by any of the methods known to those skilled in the art. One such method involves scrubbing the effluent gases with water or other appropriate solvents to remove the desired products. In such a case, the unsaturated acid product is separated and purified by conventional means such as fractional distillation, extractive distillation, and solvent extraction. Unreacted aldehyde may be recovered from the gaseous stream by well-known techniques and then recirculated back to the reactor.

The above-mentioned novel oxidation catalysts of the present invention are solids which can be employed in the process in the form of granules, pellets, powders and the like. Since the oxidation of aldehydes to unsaturated acids is highly exothermic, it is preferable to employ the catalysts in the form of a catalyst bed which is "fluidized" by the upward flow of the vapor phase reaction mixture therethrough. The use of such a fluidized bed clearly facilitates control of the reaction temperature as is well known to those skilled in the art. Other means for controlling the temperature may also be used, such as the fixed-bed reactor with heat exchange, dilution of the feed with a heat-absorbing material, and the like.

As aforesaid, the arsenic, molybdenum, tantalum, niobium, zirconium and titanium components of the novel catalysts are in catalytically active states. By this it is meant that these components are in oxidized states in the catalyst. These oxidized states may be attained by either direct oxidation of the individual components with or without the support, or by calcination of mixtures of the components in oxidized states with or without the support.

Among the preferred compounds of molybdenum suitable for use in these catalysts are molybdic acid, molybdenum compounds prepared by dissolving molybdenum trioxide or molybdic acid in aqueous solutions of citric, tartaric, lactic and oxalic acids, and molybdenum heteropoly acids such as cerimolybdic acid, dodecamolybdoceric acid, silicomolybdic acid, arsenomolybdic acid, manganomolybdic acid, and chromimolybdic acid, and salts of these acids. Examples of specific useful salts are ammonium heptamolybdate, ammonium hexamolybdochromiate and ammonium dodecamolybdocerate. Small amounts of metals other than the molybdenum, niobium, tantalum, zirconium, and titanium may also be included in the catalyst composition.

The heteropoly acids, or their ammonium salts, are characterized by each member containing a complex and high-molecular-weight anion. These anions contain a central element and at least one coordinating element as well as oxygen. In the present case cerium, silicon, or chromium, etc. serves as the central element. Molybdenum serves as the coordinating element. The central atom, or heteroatom, is normally at the center of an $XO_4$ tetrahedron or an $XO_6$ octahedron. Coordinating atoms of molybdenum are at the center of $MoO_6$ octahedra. These octahedra coordinate about the central atom, sharing oxygen atoms, to yield the heteropoly anion. Hydrogen ions, or cations such as ammonium, as well as molecules of water of hydration are associated with the complex anion.

Molybdenum may also be supplied to the catalyst in the form of ammonium heptamolybdate or molybdenum trioxide. The ammonium heptamolybdate is quite useful in its commercially available form while the molybdenum trioxide should be dissolved in ammonium hydroxide prior to incorporation into the catalyst composition. It is believed that during the calcination of the catalyst the molybdenum component, whatever its initial form, is ultimately converted at least in part to a form of molybdenum trioxide or some complex thereof. This speculation, however, should not be interpreted as a limitation of the scope of this invention. A further discussion of this matter is presented in a later portion of this specification.

The arsenic component of the catalyst may consist of one or more different compounds of arsenic such as elemental arsenic, arsenic (III) oxide, arsenic (V) oxide, and salts of arsenic, such as titanium arsenate, zirconium arsenate, or arsenites. The preferable forms of arsenic are the oxides, and arsenic (III) oxide is particularly preferred because of its ease of handling and effectiveness. These arsenic compounds are incorporated into the catalyst in any one of several different ways as will be described in a later portion of this specification.

Another component of the catalyst may be a compound of zirconium or titanium in oxidized states or a mixture of compounds of one or both of these elements. It is desirable that the titanium or zirconium compound be incorporated in the catalyst as either a water-soluble compound or as a reactive hydrous oxide. Therefore, oxides, halides, citrates, tartrates, lactates and sulfates of these elements are usable as well as the so-called titanium "acid cake" which is an intermediate in the commercial production of titania from titanium sulfate. It is believed that under the conditions of catalyst preparation these materials are converted at least in part to titanium or zirconium dioxides, or complexes thereof, but this speculation should not be construed so as to limit in any way the scope of this invention.

A further component of the catalyst may be a compound of tantalum or niobium in oxidized states or a mixture of compounds of one or both of these elements. It is desirable that this component be incorporated into the catalyst preparation in a reactive or soluble form. Niobium pentoxide, when freshly precipitated from an aqueous solution is initially a reactive hydrous oxide, and is quite useful, but on standing some hours it apparently polymerizes to a considerable degree, yielding a much less reactive species. A particularly effective form of niobium or tantalum is the oxalate, which in each case is readily soluble in a water solution which contains oxalic acid. Other forms of these elements, such as the halides or freshly precipitated oxides or other complex organic derivatives such as the lactates, tartrates, or citrates may also be used in preparing the catalyst compositions of our invention. It is believed that under the conditions of catalyst preparation these materials are converted at least in part to niobium or tantalum pentoxides, or complexes thereof. This speculation, as previously mentioned, should not be construed so as to limit in any way the scope of this invention.

The catalyst compositions of this invention may be unsupported but are preferably carried on a supporting material such as silica, silica-alumina, or silicon carbide, with silica being the preferred supporting material. Supports such as these tend to impart desirable physical properties to the catalyst and also reduce the cost of the ultimate catalyst composition. It is to be emphasized here, though, that the catalyst has activity in the absence of a support, and the invention should not be construed as limited to supported catalysts alone.

Because of the highly reactive nature of the vapor phase mixture containing oxygen and propylene in the presence of a catalyst at elevated temperatures, the exact structure of the catalyst is uncertain. The catalyst may be a mixture of one or more oxides or salts of molybdenum in admixture with one or more oxides or salts of niobium, zirconium, titanium and/or tantalum. Furthermore, when arsenic is present, its structure is uncertain, being one or more oxides or salts thereof. It may also be that the total catalyst composition is a substantially homogeneous micromixture of loose chemical combinations of oxides of molybdenum and oxides of niobium, zirconium, titanium and/or tantalum together with oxides of arsenic. It is most likely that the catalyst exists in both conditions with oxides or salts of molybdenum, niobium, antalum, zirconium, titanium and arsenic as well as the various loose chemical combinations of these components. In any event, it is known that the catalyst composition does contain materials in an oxidized state, i.e., the materials have an increased oxidation state (positive valence) in which the atoms have lost one or more electrons.

As pointed out hereinbefore, the exact composition of the catalyst at the time the reaction occurs is not known with certainty. However, when the molybdenum content of the catalyst is reported as $MoO_3$, the zirconium content of the catalyst is reported as $ZrO_2$, the niobium content of the catalyst is reported as $Nb_2O_5$, the titanium content is reported as $TiO_2$, the tantalum content is reported as $Ta_2O_5$, the arsenic content is reported as $As_2O_5$, and the central element contents of the heteropoly acid or its ammonium salt such as cerium, silicon, or chromium are reported as $CeO_2$, $SiO_2$, and $Cr_2O_3$, the broad, preferred and most preferred limits for the catalyst composition on a weight percent basis are as follows:

CATALYST COMPOSITION, WT. PERCENT

| Expressed as component | Broad | Preferred | Most preferred |
|---|---|---|---|
| $MoO_3$ | 5-60 | 10-50 | 20-45 |
| $Nb_2O_5$ and/or $Ta_2O_5$ and/or $TiO_2$ and/or $ZrO_2$ | 1-25 | 3-20 | 8-15 |
| $CeO_2$, $SiO_2$ or $Cr_2O_3$ | 0-7.5 | 0-5.0 | 0 |
| $As_2O_5$ | 0-25 | 3-20 | 3-15 |
| Support | 0-90 | 20-80 | 30-70 |

METHOD OF CATALYST PREPARATION

As aforesaid, the catalysts of the invention are prepared by any of several suitable methods. For example, the molybdenum component in any of its previously described forms and aqueous niobium oxalate, zirconium acetate, titanium acid tartrate, or tantalum oxalate may be used in solution to impregnate suitable supports such as silica, silica aquasol, pumice, alundum, silica gel, kieselguhr, silicon carbide and the like. The preparation is then dried, calcined and impregnated with a solution containing oxidized arsenic.

Alternatively, the catalyst is prepared by impregnating the support with a solution of the molybdenum component and one or more of the niobium, tantalum, zirconium or titanium components. The catalyst is then dried, calcined, and charged to a reactor. Following these steps, arsenic is added to the catalyst as will be described hereinafter.

In another and preferred method of catalyst preparation, the various catalyst components such as the molybdenum compound, niobium, tantalum, zirconium or titanium compound, and an arsenic oxide are added to suitable silica sols, such as silica aquasols, yielding a mixture which is dried and calcined. A variation of this technique consists of omitting the arsenic oxide from the silica sol mixture. Upon drying and calcining this alternate preparation, an arsenic-free catalyst is obtained. This catalyst is then charged to the reactor and arsenic oxide is added to it to yield an active and selective catalyst.

Yet another method of catalyst preparation involves the synthesis of a heteropoly acid or its ammonium salt in situ during the catalyst preparation. Thus, in the case of cerimolybdic acid catalyst the silica sol is first acidified and then mixed with ammonium heptamolybdate. This mixture is then converted to ammonium cerimolybdate in silica sol by the addition of ceric ammonium nitrate thereto. Upon adding niobium oxalate, tantalum oxalate, zirconium acetate or titanium acid tartrate, and an arsenic oxide to this mixture, followed by drying and calcination, one obtains an active and selective catalyst. This in situ preparation technique may be used with other heteropoly acids of molybdenum, or ammonium salts of these acids, such as ammonium chromimolybdate and silicomolybdic acid.

While it is frequently preferable, as is well known to those skilled in the art, to calcine catalyst preparation prior to charging the catalyst to the reactor, the catalyst of this invention may also be prepared and charged to the reactor before calcination. Calcination is then accomplished by heating the catalyst to an elevated temperature for a sufficient length of time prior to performing the subject process. This mode of catalyst preparation is usable whether or not arsenic is present in the catalyst composition at this point. If arsenic is absent from the preparation, it may be added before, during or after calcination, as described hereinafter.

When the arsenic component is initially omitted from the catalyst composition, there are several methods available for its ultimate addition thereto. A particularly preferred method is to charge the arsensic-free catalyst to a reactor, heat the catalyst to temperatures on the order of 150° to 450° C. and then pass a gaseous stream such as air containing a volatile form of arsenic through the heated catalyst bed. Thus, arsenic (III) oxide vapors are passed through the catalyst bed for a time sufficient to generate the desired arsenic content in the catalyst.

Another preferred method involves the bulk addition of a volatile arsenic compound such as arsenic (III) oxide to the catalyst composition followed by heating the composition at temperatures of 150-450° C. while passing a gas such as air through the composition at low linear velocities to aid in absorption of the arsenic oxide. This latter mode of operation is particularly preferred with fluid-bed catalyst systems.

During use of these arsenic-containing catalysts, volatile compounds of arsenic, notably arsenic (III) oxide, are slowly evolved from the catalyst and are carried away from the catalyst in the product stream. In order to offset this continual loss, arsenic may be added to the catalyst during use, either continuously or discontinuously, so that a given level of arsenic content is maintained in the reaction zone. A particularly effective method of maintaining the desired concentration of arsenic is to pass a portion of the feed stream containing aldehyde and oxygen, or a portion of the oxygen-containing gas, over a bed of a volatile arsenic compound such as elemental arsenic (III) oxide maintained at suitably elevated temperature. This suitably elevated temperature is chosen so that a desired partial pressure of the compound is maintained in the feed to the catalyst. Alternatively, a compound of arsenic (III) oxide or arsenic (V) oxide may be added to the catalyst either continuously or at intervals as, for example, by a suitable solids feeder.

When calcining the catalysts of the present invention, temperatures in excess of 600° C. should be avoided since they tend to decrease the ultimate catalytic activity of the composition.

The catalysts of this invention may be regenerated at intervals if necessary by passing an oxidizing gaseous mixture over the catalyst at elevated temperatures. Air or air diluted with flue gas or steam is an excellent agent for such regeneration.

A more complete understanding of the invention will be obtained from the following examples. The percentages of catalyst components are given using the oxide forms of the components for designation purposes only. The use of these terms should not be interpreted as an indication of the state of these components during the reaction phase of the process.

EXAMPLE 1

A catalyst comprising 5 wt. percent $As_2O_5$, 5 wt. percent $Nb_2O_5$, 35 wt. percent $MoO_3$, and 55 wt. percent $SiO_2$ is prepared as follows: To 733 g. of aqueous ammonia-stabilized silica sol (30 wt. percent $SiO_2$) is added a solution of 173 g. of ammonium heptamolybdate tetrahydrate in 150 ml. of water followed by a solution of 20 g. arsenic (V) oxide in 50 ml. of water. To this is added a solution of 59 g. of niobium oxalate, assay 23.6% Nb, in 100 ml. water containing 13.4 g. of oxalic acid dihydrate. The resulting slurry is evaporated on a hot plate with vigorous stirring and then further dried on a steam bath. The semi-dry cake is placed in an oven at 120° C. for 15 hr., after which it is calcined for 3 hr. at 250° C. and then for 2 hr. at 450° C. The catalyst is cooled in air. It is crushed and screened, retaining an 80 x 200 U.S. mesh fraction.

EXAMPLE 2

A 150 ml. portion of the catalyst of Example 1 weighing 124.1 g. is charged to the laboratory fluid-bed reactor. The catalyst is treated with air at 2,100 ml./min. STP for 2 hr. at 450° C. to remove fines. The catalyst is then evaluated as follows: During a period of 1 hr., quantities of 0.249 g. mole acrolein, 0.970 g. mole of nitrogen, 0.879 g. mole of air, and 0.753 g. mole of steam are fed to the reactor. The temperature of the catalyst is 305° C. and the contact time is 3.98 sec. The effluent from the reactor is collected by condensation in a receiver cooled by chilled water and into two traps immersed in a bath of Dry Ice and isopropyl alcohol. The condensate is diluted with water and analyzed by gas chromatography. The product contains 0.128 g. mole of acrylic acid, 0.010 g. mole of acetic acid, and 0.062 g. mole of unconverted acrolein. Thus, 51.4% of the acrolein fed is converted to acrylic acid at a yield of 68.4%. Similarly, 4% of the acrolein is converted to acetic acid at 5.4% yield. The space-time yield of acrylic acid is 61.5 g. of acrylic acid per liter of catalyst per hr.

EXAMPLE 3

The catalyst of Example 2 is evaluated at 349° C. and 3.97 sec. contact time. During a period of 1 hr., 0.232 g. mole of acrolein, 0.903 g. mole of nitrogen, 0.838 g. mole of air, and 0.703 g. mole of steam are fed to the reactor. By analysis, the products of reaction are found to contain 0.155 g. mole of acrylic acid, 0.022 g. mole of acetic acid, and 0.022 g. mole of unconverted acrolein. Thus, 66.8% of the acrolein fed is converted to acrylic acid at 73.9% yield and at a space-time yield of 74.5 g. acrylic acid per liter of catalyst per hr. The conversion to acetic acid is 9.5% at 10% yield.

EXAMPLE 4

The catalyst of Example 3 is used again for oxidation of acrolein. The temperature of reaction is 335° C. and the contact time is 4.04 sec. During 1 hr., 0.232 g. mole of acrolein, 0.903 g. mole of nitrogen, 0.838 g. mole of air, and 0.703 g. mole of steam are fed to the reactor. Analysis of the reaction product indicates that it contains 0.147 g. mole of acrylic acid, 0.016 g. mole of acetic acid, and 0.025 g. mole of unconverted acrolein. Conversion to acrylic acid is 63.6% at 71.3% yield. In addition, 6.8% of the acrolein fed is converted to acetic acid at 7.6% yield. Acrylic acid is produced at a rate of 70.7 g. per liter of catalyst per hr.

EXAMPLE 5

The catalyst of Example 4 is evaluated for oxidation of acrolein at 373° C. and 4.01 sec. contact time. Quantities of 0.223 g. mole of acrolein, 0.857 g. mole of nitrogen, 0.793 g. mole of air, and 0.667 g. mole of steam are fed to the reactor over a period of 1 hr. It is determined by analysis of the reaction product that 0.130 g. mole of acrylic acid and 0.0253 g. mole of acetic acid are produced. The product also contains 0.0306 g. mole of unconverted acrolein. Thus, 58.4% of the acrolein fed is converted to acrylic acid at 67.8% yield and at a space-time yield of 62.5 g. of acrylic acid per liter of catalyst per hr. Similarly, 11.3% of the acrolein fed is converted to acetic acid at 13.2% yield.

EXAMPLE 6

The catalyst of Example 5 is tested at 349° C. and 2 sec. contact time. During a 1-hr. evaluation, 0.4636 g. mole of acrolein, 1.805 g. mole of nitrogen, 1.663 g. mole of air, and 1.400 g. mole of steam are fed to the reactor. The products of reaction are collected and analyzed, indicating that 0.2586 g. mole of acrylic acid and 0.0216 g. mole of acetic acid are produced. In addition, 0.0934 g. mole of unconverted acrolein is collected. The conversion of acrolein to acrylic acid is 55.8% at 69.8% yield, and the space-time yield is 124.2 g. of acrylic acid per liter of catalyst per hr. Acetic acid is also produced, amounting to 4.7% conversion and 5.8% yield.

EXAMPLE 7

The catalyst of Example 6 is used for the oxidation of methacrolein. During a period of 1 hr., a feed mixture consisting of 0.245 g. mole of methacrolein, 0.865 g. mole of nitrogen, 0.806 g. mole of air, and 0.677 g. mole of steam is fed to the reactor. The temperature of reaction is 360° C. and the contact time is 4 sec. The product is analyzed and found to contain 0.016 g. mole of methacrylic acid, 0.002 g. mole of acrylic acid, 0.014 g. mole of acetic acid, and 0.167 g. mole of unconverted methacrolein. Thus, methacrylic acid is produced at 6.5% conversion and 20.5% yield and at a space-time yield of 9.2 g. per liter of catalyst per hr.

EXAMPLE 8

The catalyst of Example 7 is tested in a run where steam diluent is not added to the feed. The run is made at 350° C. and 4.0 seconds contact time, with the feed containing acrolein, air, and nitrogen in the mole ratio of 1:3.4:7.0. The conversion to acrylic acid is 47.6% at a yield of 59.0%; the conversion to acetic acid is 2.3% at 2.9% yield.

EXAMPLE 9

A catalyst is prepared as in Example 1, with arsenic pentoxide being omitted from the preparation. Thus this catalyst comprises 5.3% $Nb_2O_5$ and 36.9% $MoO_3$ on silica. Then 150 ml. of 80 x 200 mesh material (116 g.) is charged to a laboratory fluid-bed reactor. To the catalyst is added 5.8 g. of granular $As_2O_3$, and this mixture is heated at 200° C. for 2 hours while air is passed through the reactor at a rate just sufficient to fluidize the catalyst. The treated catalyst is then heated to 340° C. in air and tested with a feed stream comprising acrolein, air, steam, and nitrogen in the mole ratio of 1:3.71:2.97:3.91. During the run the reaction temperature is 359° C., and the contact time is 3.1 seconds. Over an hour's run, the conversion to acrylic acid is 54.3% at a 69.4% yield; the conversion to acetic acid is 9.2% at 11.7% yield.

EXAMPLE 10

A catalyst comprising 4.3% $As_2O_3$, 8% $Ta_2O_5$, and 35% $MoO_3$ on silica is prepared. To 878 g. of 30% silica sol, ammonia-stabilized, is added with stirring 216 g. of ammonium heptamolybdate dissolved in 225 ml. of water, followed by 171 g. of a tantalum oxalate solution containing the equivalent of 40 g. of $Ta_2O_5$. Then a hot slurry of 21.5 g. of $As_2O_3$ in 40 ml. of water is added. The preparation is dried on a steam bath, and calcined in a muffle furnace for 3 hours at 250° C. and 2 hours at 450° C. It is crushed, sieved, and 150 ml. of 80 x 200 mesh material is charged to a laboratory fluid bed reactor. The catalyst is then tested at 360° C. and 3.5 seconds contact time with the feed stream comprising acrolein, air, steam, and nitrogen in the mole ratio of 1:3.2:2.1:5.0. The conversion to acrylic acid is 41.9% at 54.7% yield; the conversion to acetic acid is 6.3% at 8.3% yield.

EXAMPLE 11

A catalyst comprising 5% As$_2$O$_5$, 5% Nb$_2$O$_5$, and 40% cerimolybdic acid on silica is prepared. First, ammonium dodecamolybdocerate is prepared by adding slowly a solution of 100 g. of ceric ammonium nitrate in 1,000 ml. of water to a stirrer, boiling solution of 600 g. of ammonium heptamolybdate in 2,000 ml. of water. The preparation is allowed to cool, and the supernatant fluid is decanted. After washing the canary yellow granular product with water by decantation, it is collected on a Büchner funnel, washed with methanol, and air-dried.

To 667 g. of stirred ammonia-stabilized 30% silica sol which has been acidified to a pH of 6 with nitric acid is added 183 g. of pulverized ammonium dodecamolybdocerate. Then a solution of 20 g. of As$_2$O$_5$ in 50 ml. of water is added, followed by 81 g. of niobium oxalate in 120 ml. of 10% oxalic acid solution. The yellow sol is heated on a hot plate with stirring for one hour, then evaporated to dryness on a steam bath. After drying overnight in an oven, it is calcined as in Example 10. One hundred and fifty milliliters of 80 x 200 mesh material is tested in a fluid bed reactor at 321° C. and 4.05 seconds contact time. The feed steam comprised acrolein, air, steam and nitrogen in the mole ratio of 1:2.86:3.05:3.77. The conversion to acrylic acid is 46.1% at 63.7% yield; the conversion to acetic acid is 3.2% at 4.5% yield.

EXAMPLE 12

A catalyst comprising 10.8% TiO$_2$, 29.2% MoO$_3$ and 60% SiO$_2$ is prepared. To 200.0 g. of stirred 30% silica aquasol, which is ammonia-stabilized, is added 16.4 ml. of 1HNO$_3$, 3H$_2$O followed by 36.1 g. of ammonium heptamolybdate tetrahydrate which has been previously dissolved in 100 ml. of distilled water. To this stirred mixture is added 25.6 g. of TiCl$_4$. The gel which forms from the bright yellow mixture after heating on a hot plate for about 20 min. is evaporated on a steam bath for about 7 hours with occasional stirring. It is dried at 120° C., and calcined 3 hours at 250° C. and 2 hours at 450° C. The preparation is ground and screened to obtain 10 ml. (8.5 g.) of 30 x 60 mesh material which in turn is placed in a 16 mm.-i.d. fixed-bed reactor. The catalyst is heated at 360° C. in 16 ml./min. of air for about 1 hour after adding 1.0 g. of As$_2$O$_3$ to the top of the bed and then tested at 360° C. for 1 hour at a contact time of 3.46 sec. and a reactant feed, expressed as ml./min. STP, consisting of 6.4 acrolein vapor, 32.1 water vapor, 16 nitrogen and 16 air. A 30.6% conversion to acrylic acid is found at a 55.1% yield. The corresponding percent conversion and yield of acrolein to acetic acid are 2.3 and 3.8 respectively.

EXAMPLE 13

A catalyst comprising 10.8% ZrO$_2$, 29.2% MoO$_3$, and 60% SiO$_2$ is prepared as described in the previous example, with the exception that ZrCl$_4$ is utilized as a starting material instead of TiCl$_4$. After adding 1.0 g. of As$_2$O$_3$ to the top of the catalyst bed, the catalyst is tested with the same reaction conditions as described in Example 12 above. The percent conversion to acrylic acid is 29.1 at a 40.4% yield. The percent conversion and yield to acetic acid are 2.0 and 2.8, respectively.

It will thus be seen from the above examples and description that the present invention provides, not only a novel process for the preparation of an unsaturated acid from an unsaturated aldehyde, but also novel catalyst compositions for this purpose. Specifically, these catalyst compositions are characterized by the fact that they contain arsenic, molybdenum, and at least one of niobium, titanium, tantalum, or zirconium, and by the further fact that all these elements are present in oxidized form. The use of these novel catalysts affords a novel method of converting acrolein and methacrolein to the corresponding alpha, beta-unsaturated monocarboxylic acids in high yields. Other advantages will be apparent to those skilled in the art.

As will also be apparent to those skilled in the art, the invention has particular utility in connection with the production of methacrylic and acrylic acid which are major chemical intermediates. In addition, polymeric forms of acrylic acids and acrylate esters are widely used in the plastics and protective coatings industry.

Although the invention has been described in considerable detail with particular reference to preferred embodiments thereof, variations and modifications may be effected within the spirit and scope of the invention as described hereinabove, and as defined by the following appended claims.

We claim:

1. Process for the oxidative conversion of an alpha,beta-unsaturated aldehyde to the corresponding alpha,beta-unsaturated acid comprising contacting a mixture of said aldehyde and oxygen in the vapor phase at a temperature between about 250° C. to about 500° C. with a solid catalyst composition consisting essentially of an oxide, acid or salt compound of molybdenum, an oxide or salt of arsenic, and one of an oxide or salt compound of niobium and tantalum.

2. The process of claim 1 wherein the catalyst composition is carried on an inert support.

3. The process of claim 2 wherein an analysis of the catalyst composition on a weight percent basis, when expressed as the theoretical oxides, is:

| | Percent |
|---|---|
| MoO$_3$ | 5–60 |
| Nb$_2$O$_5$ or Ta$_2$O$_5$ | 1–25 |
| Support | 0–90 | with the remainder being As$_2$O$_5$.

4. The process of claim 3 wherein the aldehyde is acrolein or methacrolein, the catalyst composition is carried on a silica support, the temperature is about 300° C. to about 400° C., and an analysis of the catalyst composition on a weight percent basis, when expressed as the theoretical oxides, is:

| | Percent |
|---|---|
| MoO$_3$ | 10–50 |
| Nb$_2$O$_5$ or Ta$_2$O$_5$ | 3–20 |
| As$_2$O$_5$ | 3–20 |
| SiO$_2$ | 20–80 |

5. The process of claim 4 wherein oxygen is present in the form of air, the ratio of aldehyde to oxygen on a mole basis is from about 1:0.3 to about 1:5 and the aldehyde and air are contacted with the catalyst composition for about 0.5 to about 20 seconds.

6. The process of claim 4 wherein oxygen is present in the form of air, the ratio of aldehyde to oxygen on a mole basis is from about 1:0.4 to about 1:1.5 and the aldehyde and air are contacted with the catalyst composition for about 1 to about 10 seconds.

7. A process for oxidatively converting acrolein to acrylic acid or methacrolein to methacrylic acid comprising the step of reacting acrolein or methacrolein with oxygen in the presence of a catalyst consisting essentially of oxidized arsenic, oxidized molybdenum and one of oxidized niobium and tantalum.

References Cited

UNITED STATES PATENTS 3,280,182 10/1966 Gasson et al. _____ 260—530U

FOREIGN PATENTS 1,007,405 10/1965 Great Britain _____ 260—530
903,034 8/1962 Great Britain _____ 260—530

LORRAINE A. WEINBERGER, Primary Examiner

D. E. STENZEL, Assistant Examiner

U.S. Cl. X.R.

252—456